(12) United States Patent
Mantovani

(10) Patent No.: US 11,590,896 B2
(45) Date of Patent: Feb. 28, 2023

(54) MODULAR VEHICLE RUNNING BOARD

(71) Applicant: Keko Acessorios S/A, Caxias do Sul (BR)

(72) Inventor: Juliano Scheer Mantovani, Caxias do Sul (BR)

( * ) Notice: Subject to any disclaimer, the term of this patent is extended or adjusted under 35 U.S.C. 154(b) by 0 days.

(21) Appl. No.: 16/630,565

(22) PCT Filed: Oct. 3, 2019

(86) PCT No.: PCT/BR2019/050430
§ 371 (c)(1),
(2) Date: Jan. 13, 2020

(87) PCT Pub. No.: WO2021/062499
PCT Pub. Date: Apr. 8, 2021

(65) Prior Publication Data
US 2022/0227297 A1 Jul. 21, 2022

(51) Int. Cl.
*B60R 3/00* (2006.01)
(52) U.S. Cl.
CPC .................................... *B60R 3/002* (2013.01)
(58) Field of Classification Search
CPC ...................................................... B60R 3/002
See application file for complete search history.

(56) References Cited

U.S. PATENT DOCUMENTS

| | | | | |
|---|---|---|---|---|
| 4,203,611 A * | 5/1980 | Makela | .................... | B60R 3/002 280/163 |
| 4,451,063 A * | 5/1984 | Snyder | .................... | B60R 3/002 403/386 |
| 4,456,275 A * | 6/1984 | Snyder | .................... | B60R 3/002 182/92 |
| 4,463,962 A * | 8/1984 | Snyder | .................... | B60Q 1/323 362/495 |
| 4,557,494 A * | 12/1985 | Elwell | .................... | B60Q 1/323 24/514 |
| 4,934,721 A * | 6/1990 | Flores | .................... | B60R 3/002 280/169 |
| 6,709,137 B1 * | 3/2004 | Glovak | .................... | B60R 3/002 362/555 |
| 7,513,518 B1 * | 4/2009 | Mayville | .................... | B60R 3/002 280/169 |
| 8,403,348 B1 * | 3/2013 | Wang | .................... | B60R 3/002 280/165 |
| 9,409,520 B1 * | 8/2016 | Wang | .................... | B60R 3/002 |
| 9,937,865 B1 * | 4/2018 | Oakey | .................... | B60R 3/002 |
| 10,518,727 B1 * | 12/2019 | Barbuta | .................... | B60R 19/42 |
| 11,214,200 B1 * | 1/2022 | Oakey | .................... | B60R 3/002 |

(Continued)

*Primary Examiner* — Jeffrey J Restifo
(74) *Attorney, Agent, or Firm* — Warshaw Burstein, LLP

(57) ABSTRACT

The modular vehicle running board, subject matter of the invention, comprises a profile (10) provided with projections (12) and cavities (14) and (15) for the modular arrangement of assembly components and trims (20), (40) and (41), allowing the arrangement of lighting points (36) and the attachment of a non-slip step (30), in order to optimize the assembly system and allow greater product variability in a single profile/chassis. The result is a modular vehicle running board endowed with new constructive characteristics facilitating manufacture and adaptation in different models.

20 Claims, 17 Drawing Sheets

(56) References Cited

U.S. PATENT DOCUMENTS

| | | | | |
|---|---|---|---|---|
| 2005/0263974 A1* | 12/2005 | Mulder | B60R 3/00 | 280/163 |
| 2005/0263975 A1* | 12/2005 | Mulder | B60R 3/04 | 280/163 |
| 2007/0085376 A1* | 4/2007 | Kuntze | B60R 3/002 | 296/163 |
| 2007/0126201 A1* | 6/2007 | Crandall | B60R 3/002 | 280/163 |
| 2007/0138757 A1* | 6/2007 | Kuntze | B60R 3/002 | 280/163 |
| 2007/0296175 A1* | 12/2007 | Flajnik | B60R 3/002 | 280/169 |
| 2008/0018074 A1* | 1/2008 | Steffens | B60R 3/00 | 280/163 |
| 2008/0084045 A1* | 4/2008 | Filias | B60R 3/002 | 280/166 |
| 2008/0251665 A1* | 10/2008 | Armstrong | B60R 3/002 | 248/207 |
| 2009/0224505 A1* | 9/2009 | Peterson | B60R 3/002 | 280/164.1 |
| 2017/0106918 A1* | 4/2017 | Diller | B21C 23/085 | |
| 2019/0092226 A1* | 3/2019 | Chen | G02B 27/30 | |
| 2020/0361386 A1* | 11/2020 | Schoonover | B60R 3/002 | |
| 2021/0309153 A1* | 10/2021 | Luo | B60R 3/002 | |

* cited by examiner

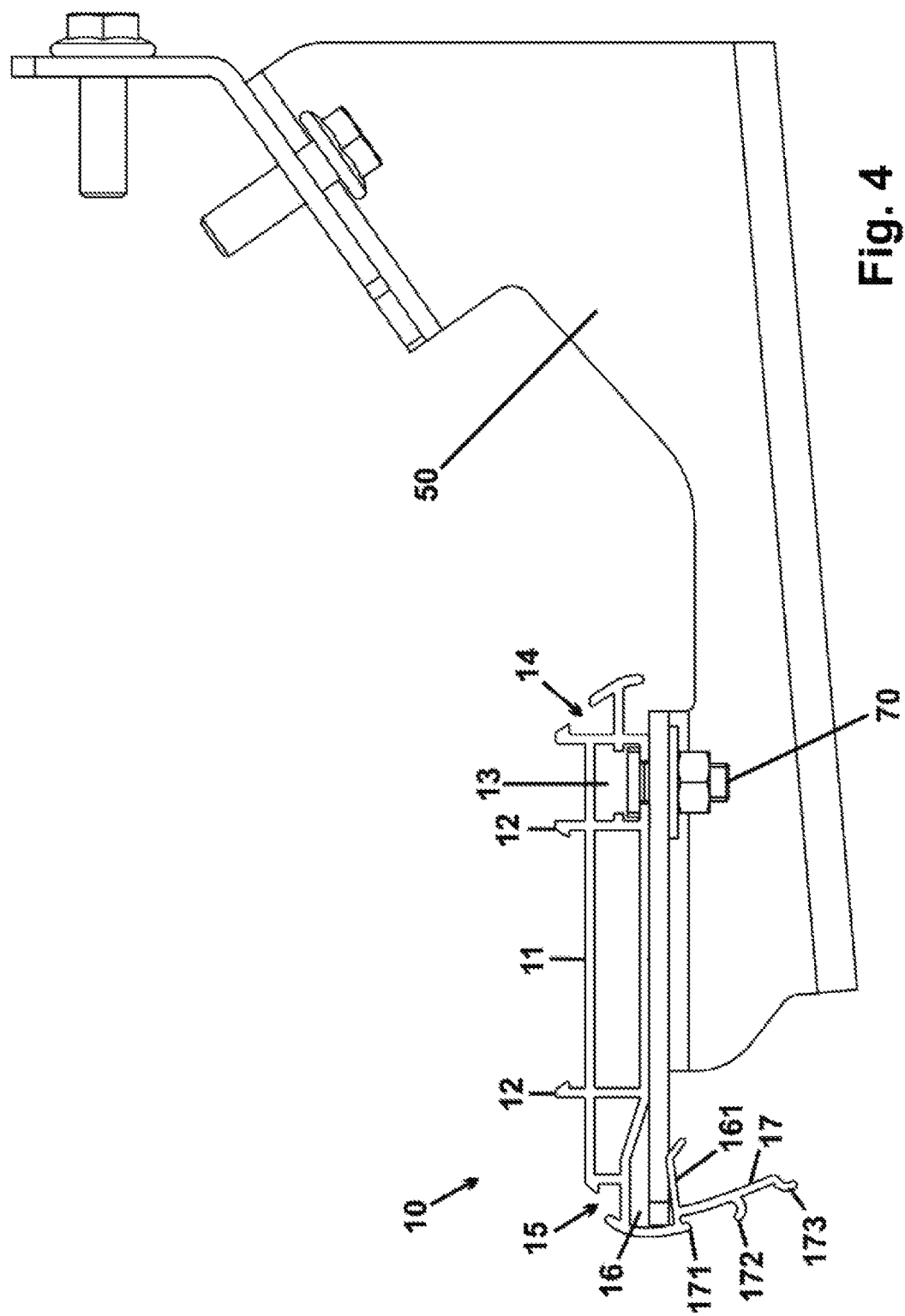

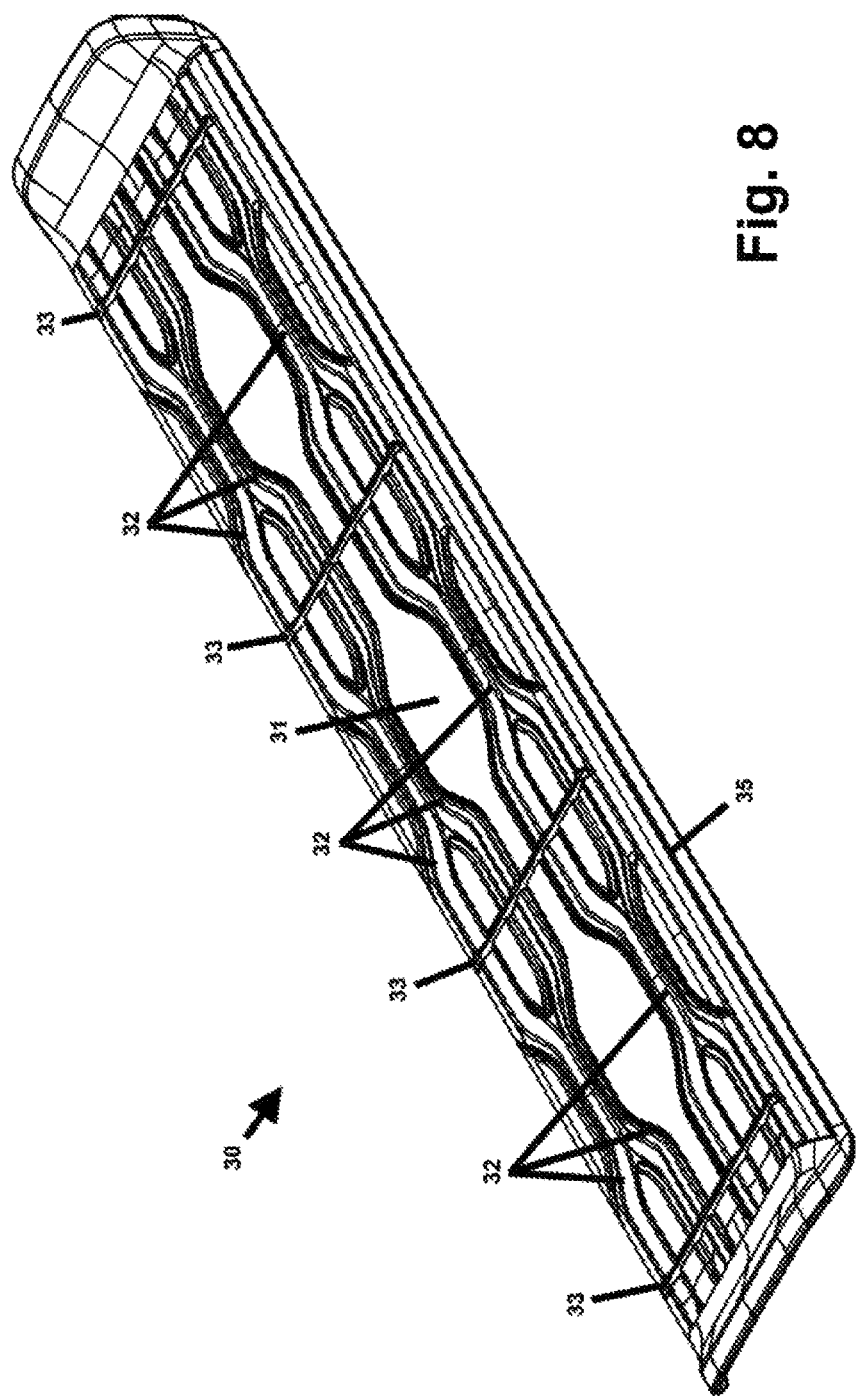

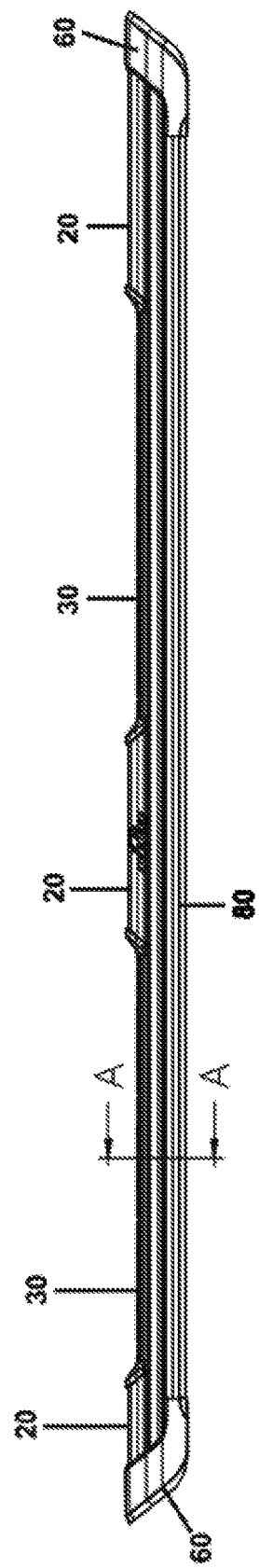

MODULAR VEHICLE RUNNING BOARD

FIELD OF THE INVENTION

This invention describes a modular vehicle running board. More specifically, it comprises a profile provided with projections and cavities for the modular arrangement of assembly components and trims, allowing the arrangement of lighting points and the attachment of a non-slip step, in order to optimize the assembly system and allow greater product variability in a single profile/chassis. The result is a modular vehicle running board endowed with new constructive characteristics facilitating manufacture and adaptation in different models.

BACKGROUND OF THE INVENTION

Vehicle running boards are accessories fitted to the underside of doors to facilitate passenger boarding in vehicles with raised ride heights such as pickup trucks and SUVs.

The vehicle running boards mainly consist of a linear body that allows the attachment of a non-slip step and trim tips arranged at the ends, and the attachment to the vehicle is achieved by means of brackets which are attached to the bottom of the vehicle and the lower portion of the running board. This system may vary according to the make and model of the vehicle.

However, the existing models of running boards on the market have several drawbacks due to the constructive form not allowing the replacement of damaged parts, not allowing greater variability of product adjustments and rendering the manufacturing process difficult due to the need to manufacture a profile for each running board model.

Thus, this holder has developed a new concept of vehicle running boards with a linear profile that has several cavities and slots, allowing the attachment and fitting of trims and components in a modular manner, ensuring greater variability, ease of assembly and optimization in the manufacturing process. In addition, this construction makes it possible to arrange lighting points to facilitate the identification of the running board and the fitting of the non-slip step on the bracket, whereas said step prevents the accumulation of water due to its construction.

In a research carried out with the state of the art, we have identified several documents describing improvements applied to vehicle running boards, of which we can emphasize the following documents;

Document BR1000270-7, by the same holder, describes a vehicle-mounted running board profile which comprises a linear body of adjustable length and provided with cavities for the fitting of non-slip trims and tips at the ends, eliminating the use of attachment means.

Document BR202014000793-3, by the same holder, describes a vehicle running board comprising a structural profile and a trim profile with cutouts for the inclusion of a non-slip element, eliminating the need for attachment means and allowing the trim profile to remain fully pressed against the vehicle without causing damage to the surface.

These documents, from the same holder, describe constructions applied to the profile to assist in the attachment of the components and to allow a better adaptation to the vehicle; however, these documents do not describe a modular system applied to the running board manufacturing and assembly system.

Documents BR10201600494 (Ford Global Technologies), U.S. Pat. No. 9,963,066 (Ford Global Technologies) and CN204736768 (Shanghai Essenway) describe constructions applied to vehicle running boards that present the arrangement of lighting points on the structure, but none of the documents refer to a constructiveness applied to the chassis allowing the modular arrangement of the trim components and the construction of an adaptation of the lighting system developed by this inventor.

Thus, the subject matter of this invention is a vehicle running board with a profile provided with projections and cavities for the modular arrangement of components and assembly trims, allowing the arrangement of lighting points and the attachment of a non-slip step in order to optimize the assembly system and allow for greater product variability in a single profile/chassis. The result is a modular vehicle running board endowed with new constructive characteristics facilitating manufacture and adaptation in different models.

BRIEF SUMMARY OF THE INVENTION

This invention is characterized by a modular vehicle running board which provides a base profile with a constructiveness allowing for easier fitting and attachment of trim structures, tips and steps.

This invention is characterized by a modular vehicle running board which provides a base profile with a constructiveness allowing for easier attachment and installation with the attachment brackets on the vehicle.

This invention is characterized by a modular vehicle running board which provides a base profile that is fitted to the vehicle attachment brackets with a specific spacing and secured by a bolt, nut and lock washer, facilitating assembly and installation.

This invention is characterized by a modular vehicle running board which provides a base profile with a constructiveness allowing for the arrangement and attachment of split or two-piece front trim structures.

This invention is characterized by a modular vehicle running board which provides a base profile with a constructiveness allowing for fitting of the steps along the upper portion, so as to provide greater variability.

This invention is characterized by a modular vehicle running board which provides a step with bas-relief tracks interconnecting with transverse-arranged slots in order for water to run off more easily and to prevent water accumulation.

This invention is characterized by a modular vehicle running board which provides a step provided in its front portion by a longitudinal opening which enables the fitting of a lighting and trim structure.

This invention is characterized by a modular vehicle running board which provides a step which can be fitted to the profile by a click or screw according to the application needs.

This invention is characterized by a modular vehicle running board which provides a step with phosphorescent, fluorescent or LED strip lighting, according to the application needs and type of running board model.

This invention is characterized by a modular vehicle running board which provides lighting points on the running board, which may be arranged with the step opening or by positioning in the lower portion of the base profile.

This invention is characterized by a modular vehicle running board which provides a running board with a base profile allowing for greater variability of the fitting attachment system of the trim and step structures.

This invention is characterized by a modular vehicle running board which provides a running board with a base profile improving the attachment and installation system of the running board on the vehicle.

BRIEF DESCRIPTION OF THE FIGURES

FIG. 4 shows the side view of the base profile attachment and assembly system with the vehicle attachment brackets.

FIG. 8 shows the perspective view of the non-slip step.

FIG. 13 shows the side view of the running board, detailing its components.

DETAILED DESCRIPTION OF THE INVENTION

Figure 1:
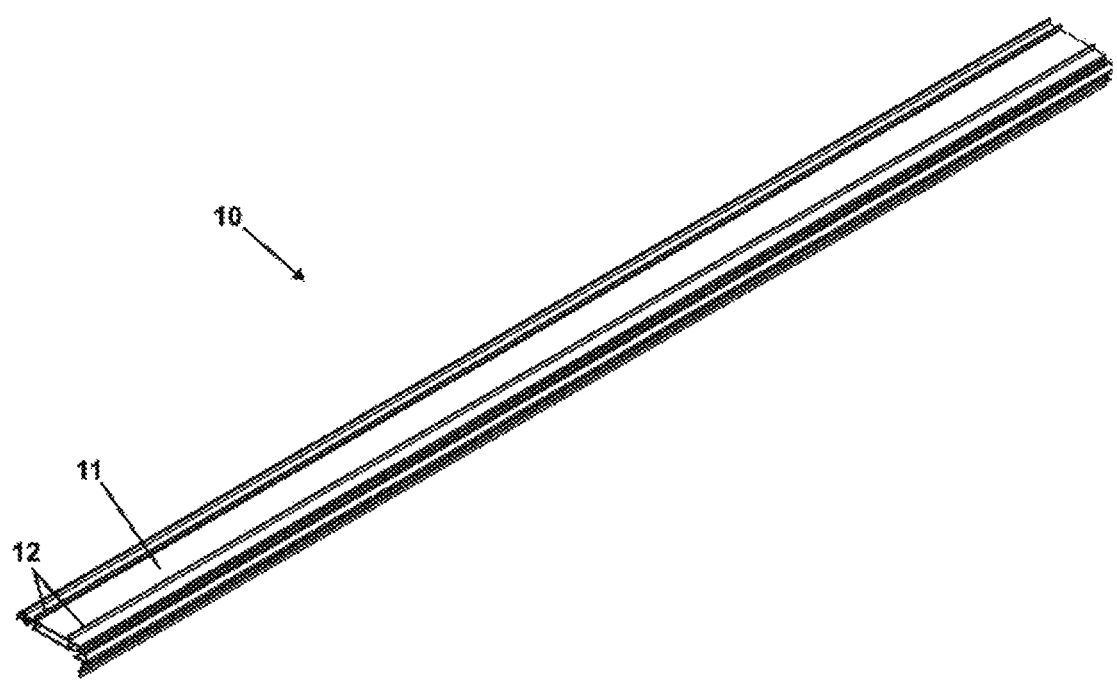
FIG. 1 shows the perspective view of the base profile.
Figure 1A:
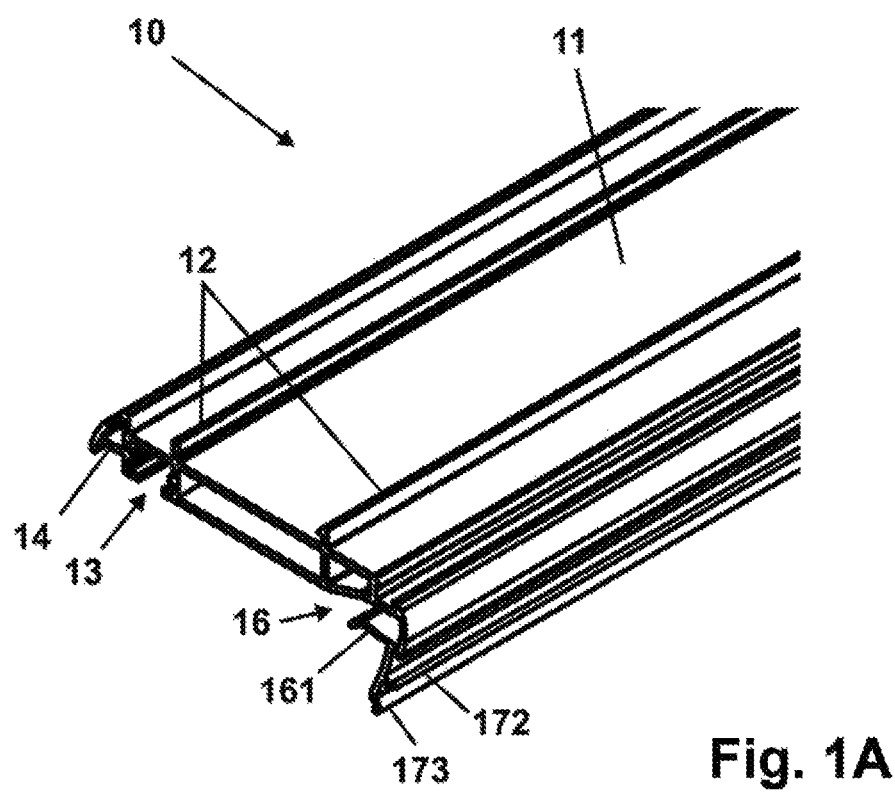
FIG. 1A shows the detail of the profile.
Figure 2:
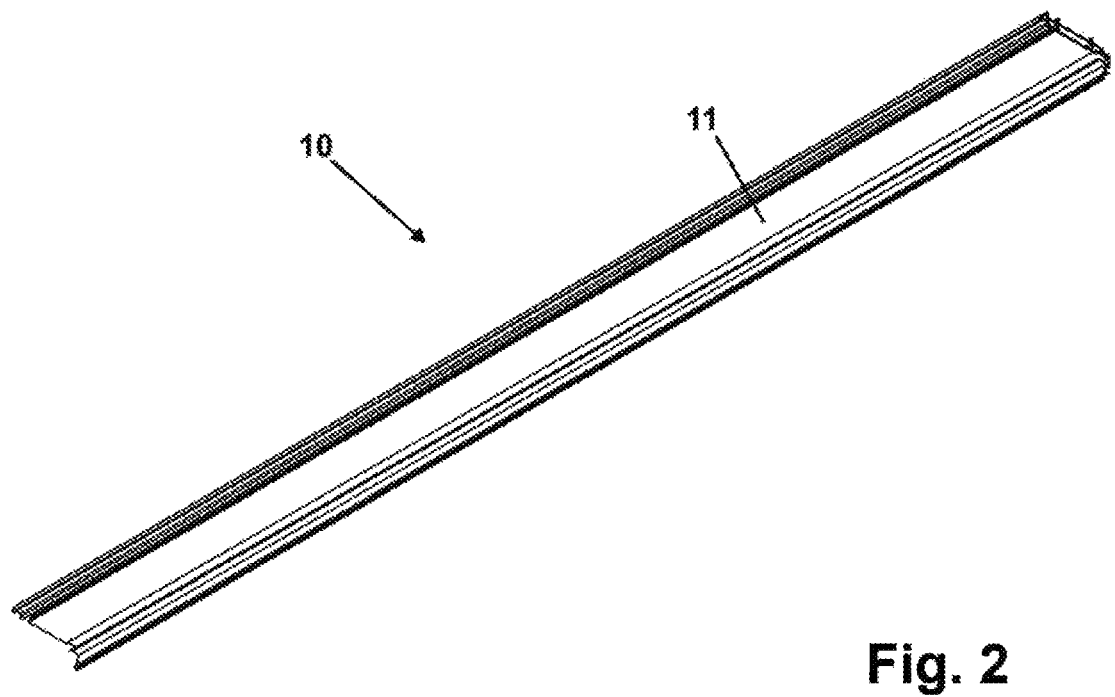
FIG. 2 shows the bottom perspective view of the base profile.
Figure 2A:
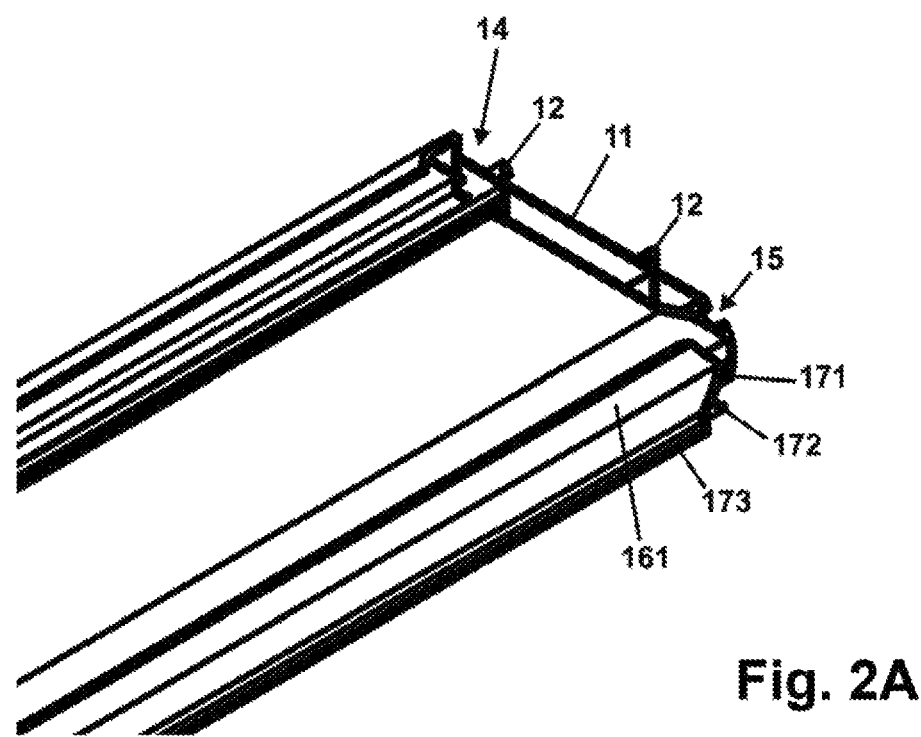
FIG. 2A shows the detail of the profile.
Figure 3:
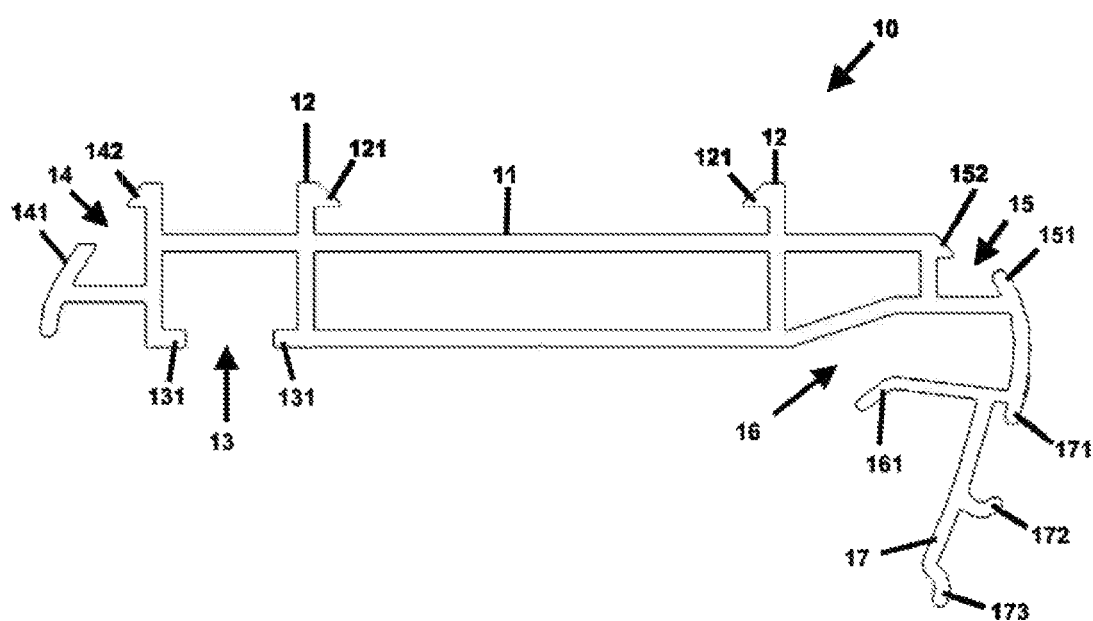
FIG. 3 shows the side view of the base profile.
Figure 4A:
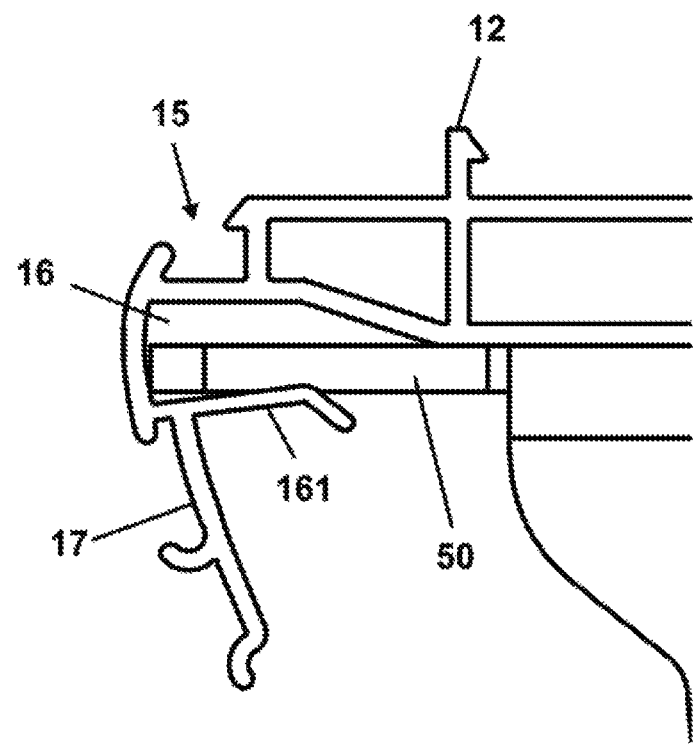
FIG. 4A shows the detail in the fitting system with the front portion.
Figure 4B:
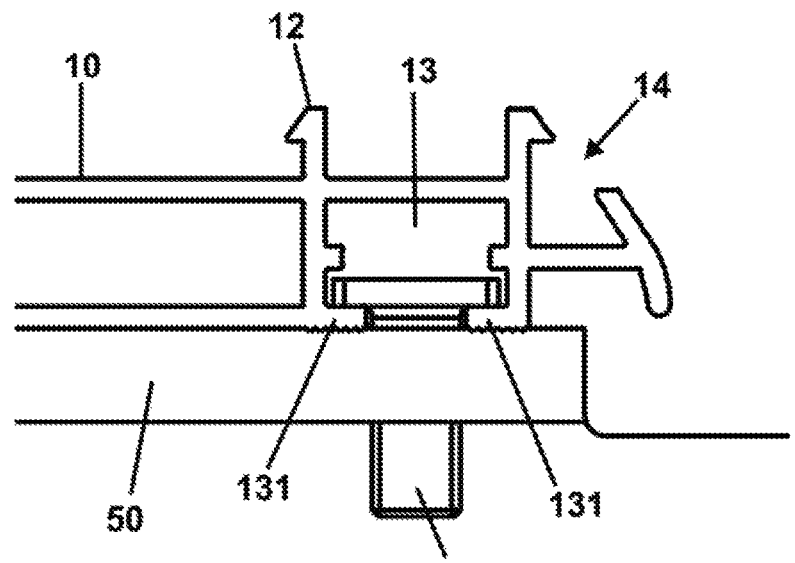
FIG. 4B shows the detail in the attachment system with a screw along the rear portion.
Figure 5:
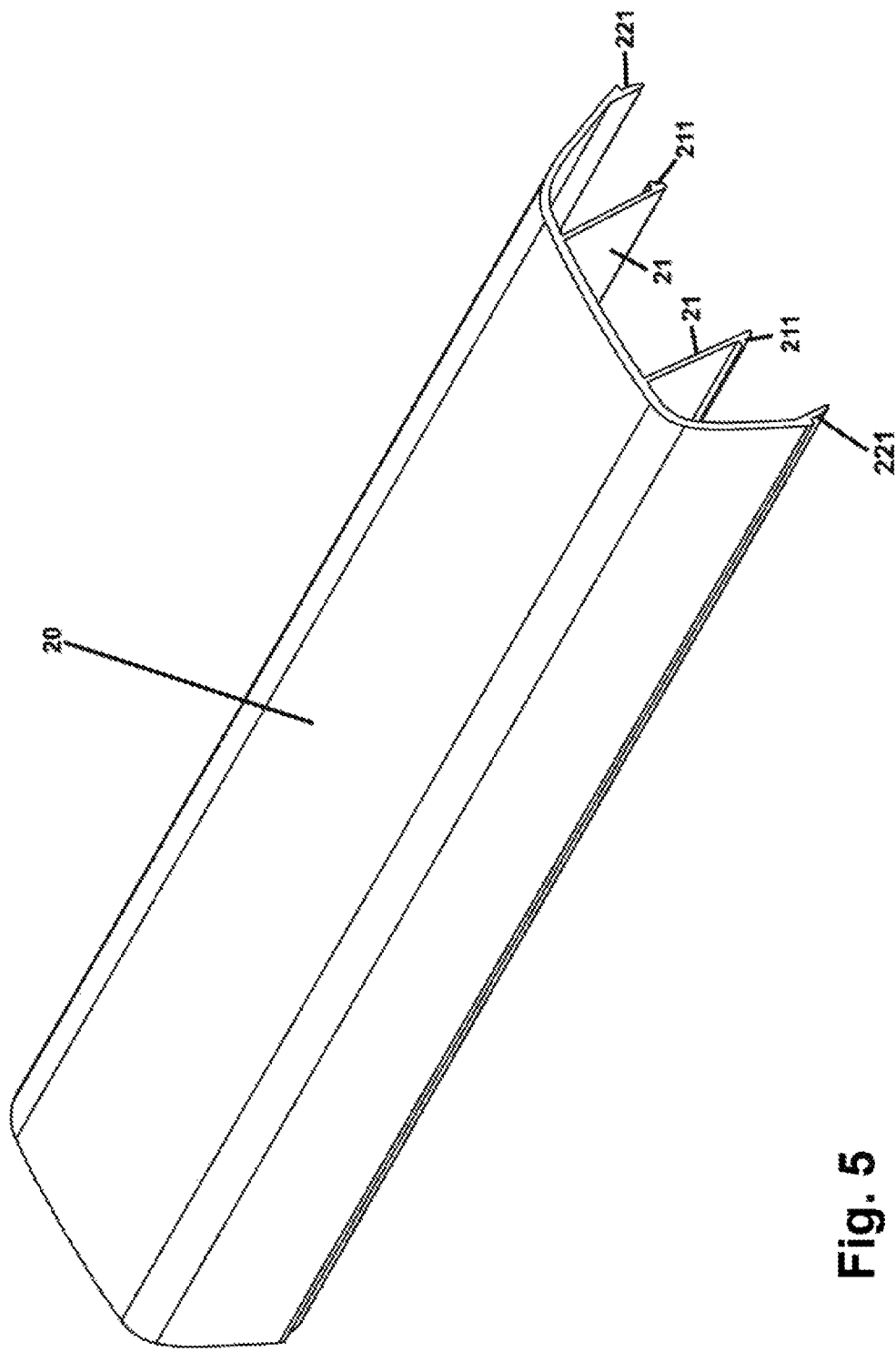
FIG. 5 shows the perspective view of the top trim structure.
Figure 5A:
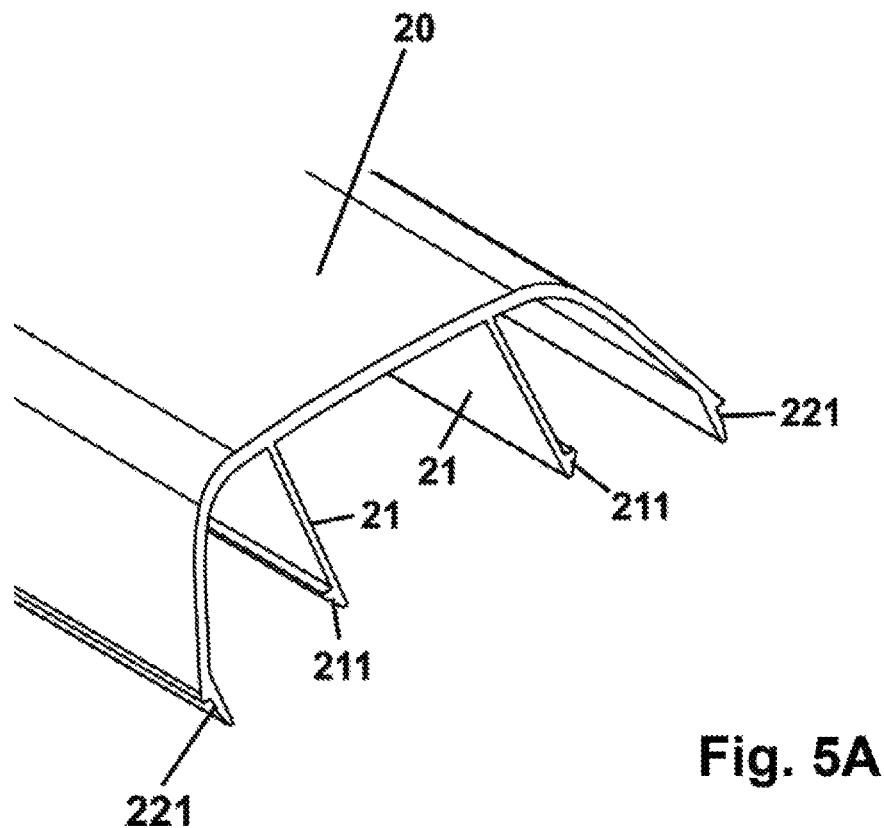
FIG. 5A shows the top trim detail.
Figure 5B:
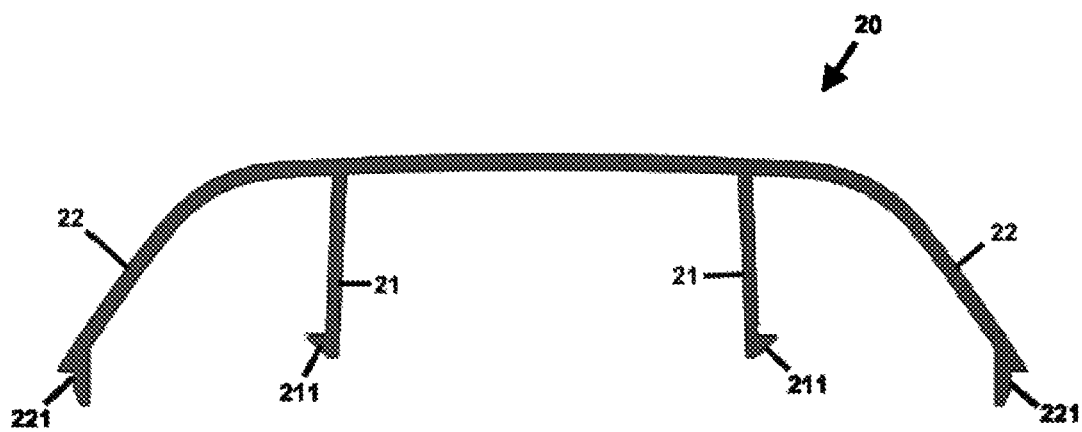
FIG. 5B shows the side view of the top trim structure.
Figure 6:
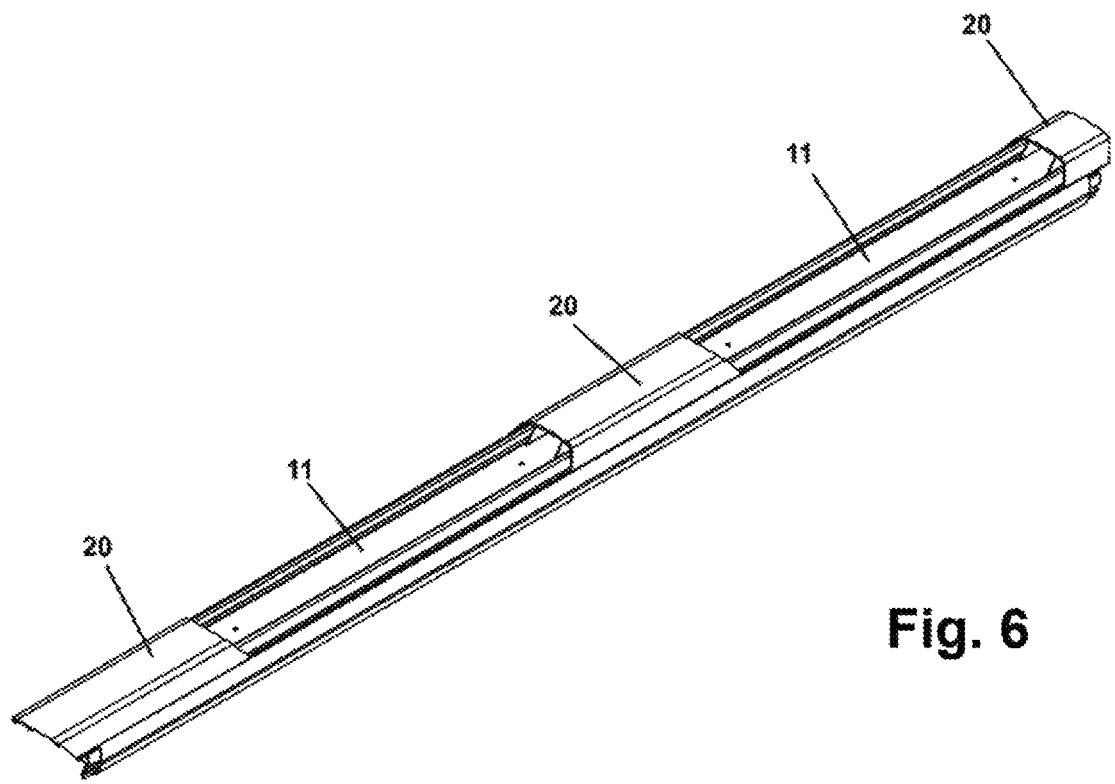
FIG. 6 shows the perspective view of the base profile assembled with the top trim structure, without the steps.
Figure 6A:
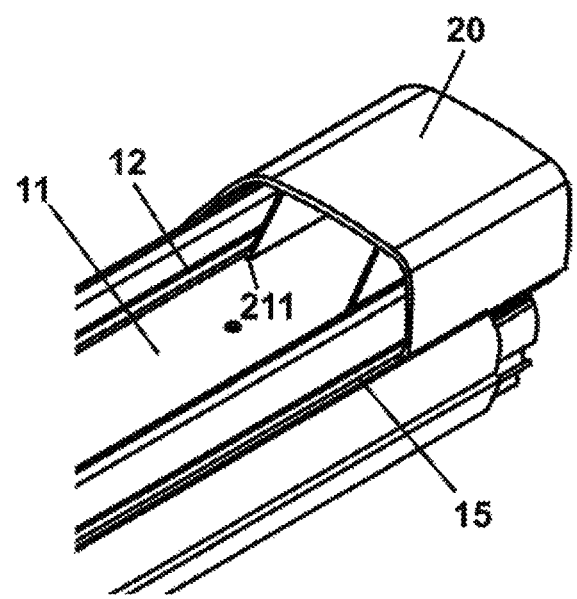
FIG. 6A shows the detail of the top trim assembly system with the base profile.
Figure 6B:
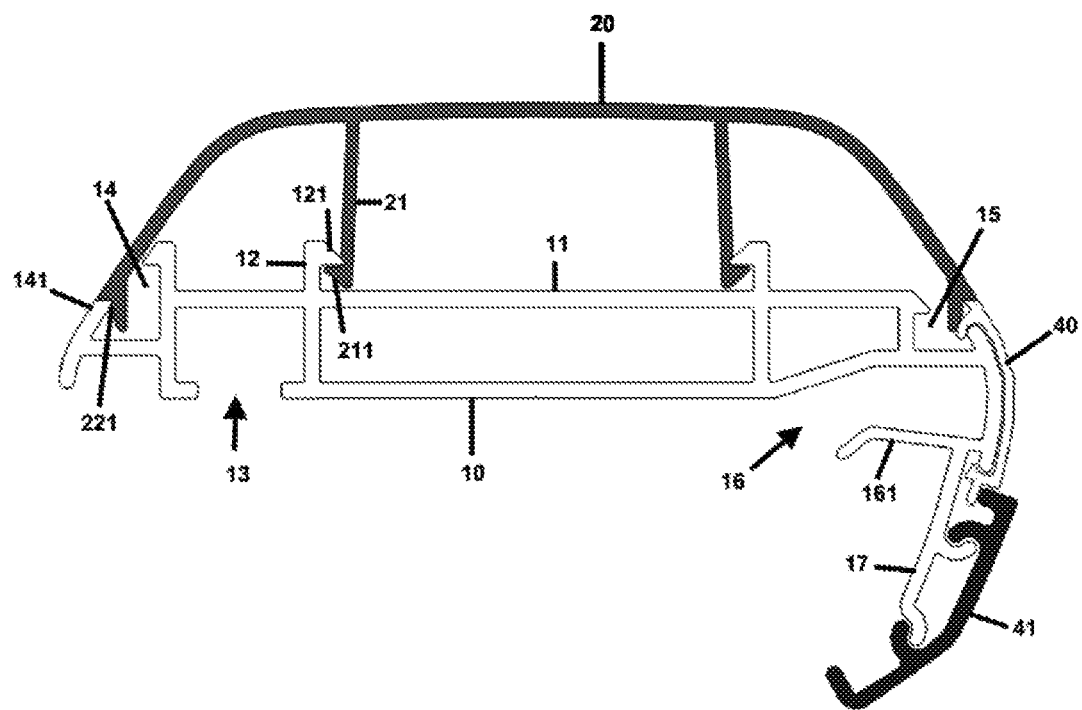
FIG. 6B shows the side view in a section of the base profile assembled with the upper trim structure and other trim structures.
Figure 7:
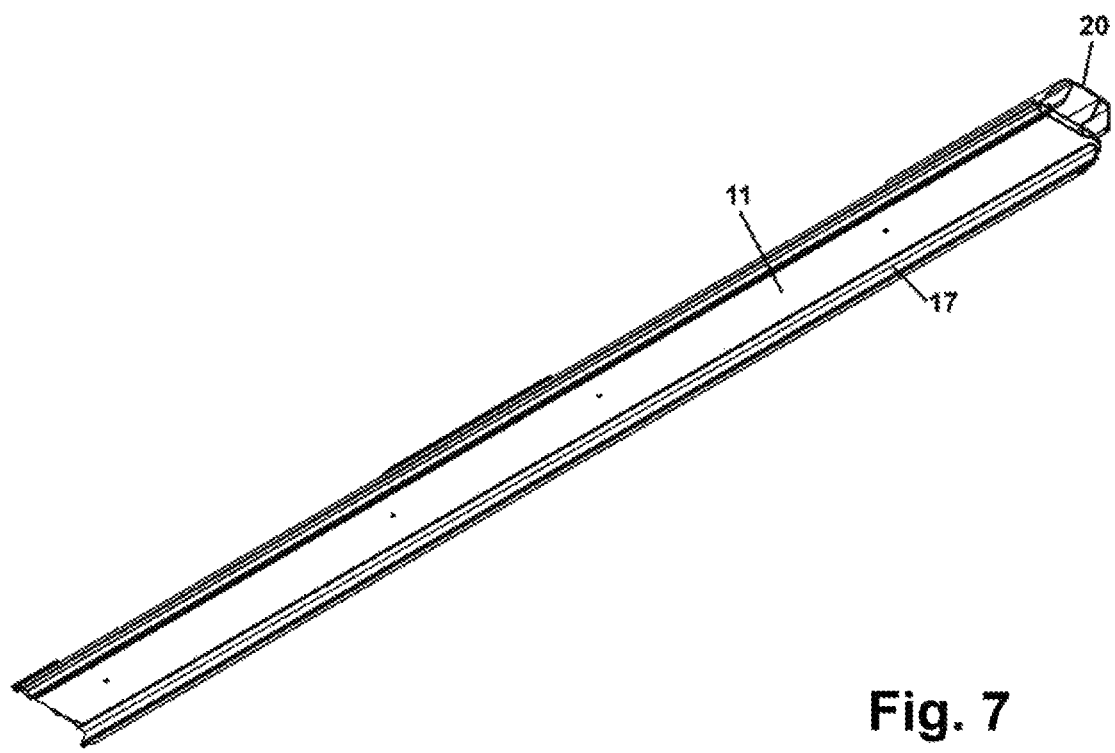
FIG. 7 shows the bottom perspective view of the base profile assembled with the top trim structure, without the steps.
Figure 7A:
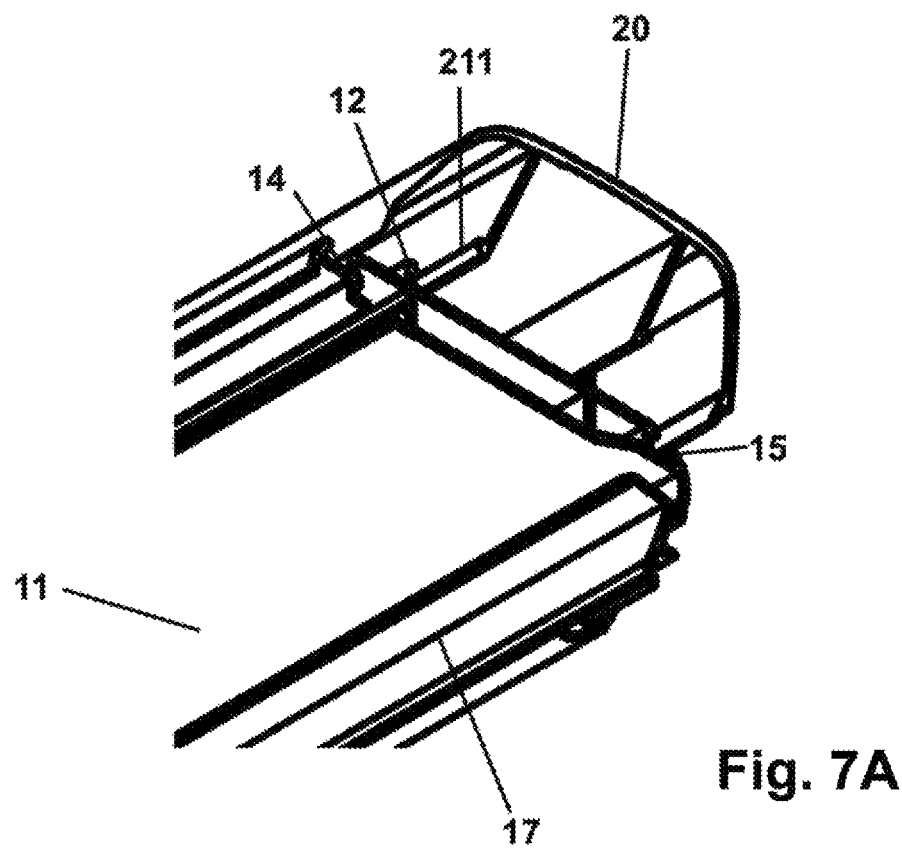
FIG. 7A shows the detail of the top trim assembly system with the base profile.
Figure 9:
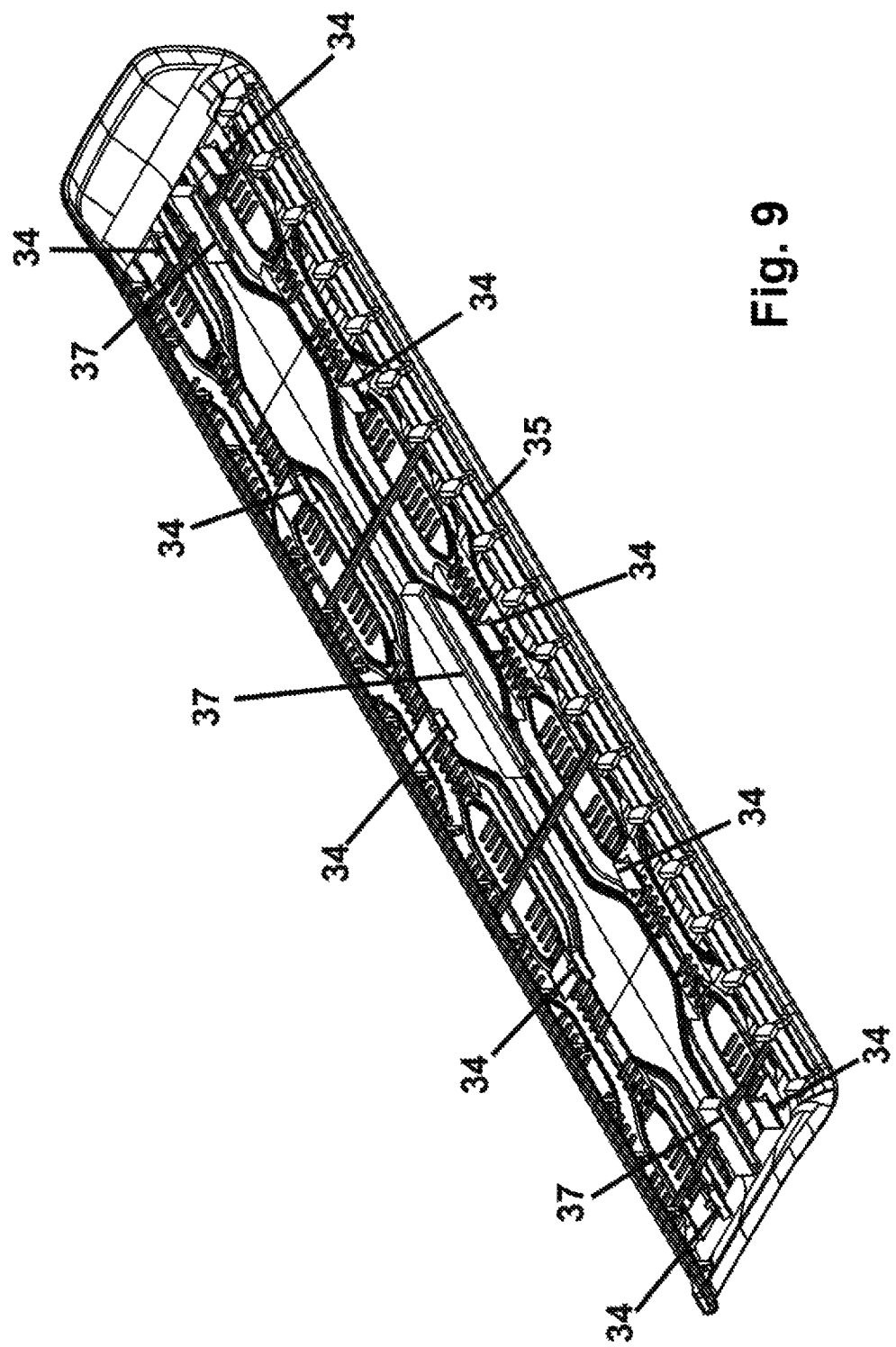
FIG. 9 shows the bottom perspective view of the non-slip step.
Figure 10:
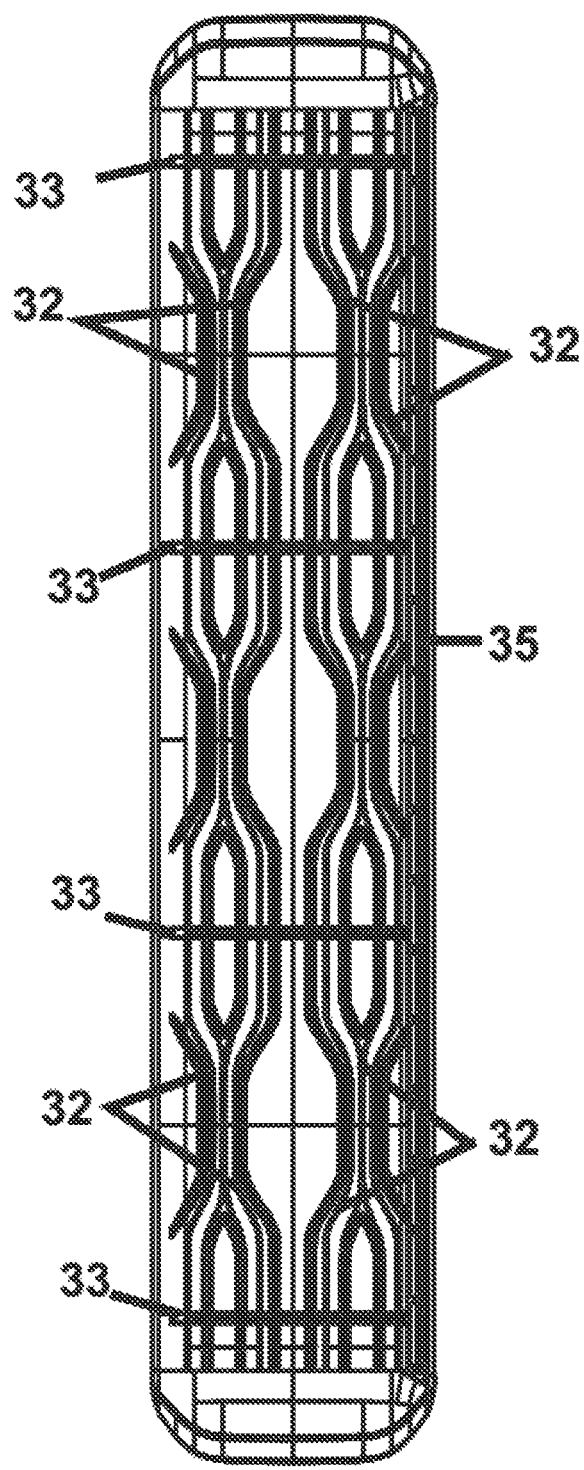
FIG. 10 shows the top view of the non-slip step.
Figure 11:
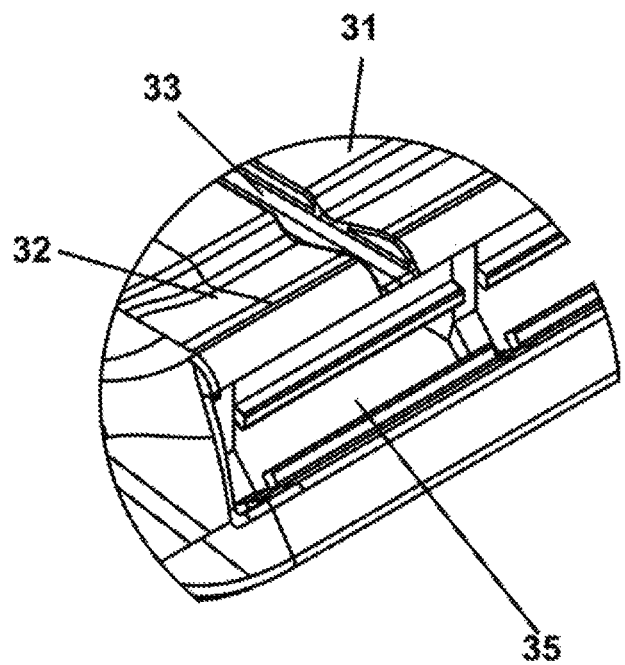
FIG. 11 shows the detail of the attachment spacing of the lighting point with the step.
Figure 12:
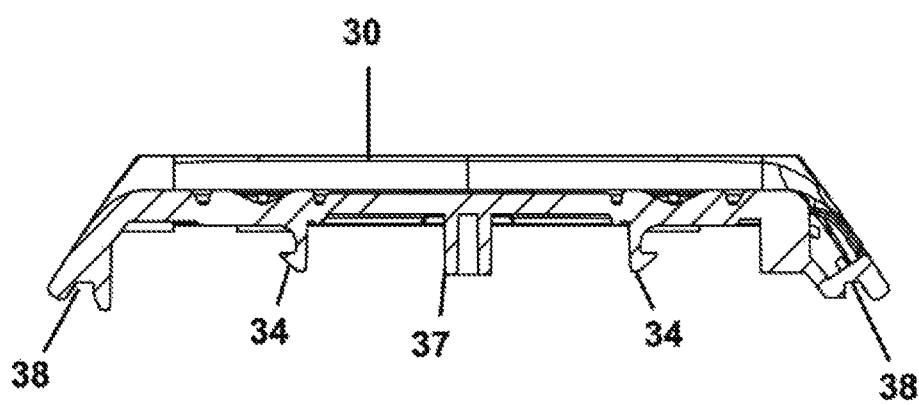
FIG. 12 shows the cross-sectional view of the step, detailing its construction.

The modular vehicle running board, subject matter of this invention, comprises a base profile (10) provided with a flat face (11) which has in its upper portion a pair of projections (12) provided with a prong (121), arranged along the base (10). With the ends of the front and rear face of the base (10), slots (14) and (15) are arranged, allowing for the positioning of the trim components together with the projections (12).

Slot (14) is provided with flaps (141) and (142) which facilitate the alignment and positioning of the trim components.

Slot (15) is provided with flaps (151) and (152) which facilitate the alignment and positioning of the trim components.

Thus, the trim components arranged with the upper flat face of the base (10) are fitted and attached through the projections (12), allowing to align and adjust the trim along the flat face (11), according to the user's installation and attachment needs, ensuring greater variability in assembly.

In the lower portion of the flat face (11), there is a slot (13) provided with flaps (131) allowing for the arrangement of the base profile set screws (10) and an opening (16) provided with a flap (161) allowing for the fitting and positioning next to the brackets attached to the vehicle.

The opening (16) and slot (13) allow the base profile (10) to be positioned quickly and easily to the brackets attached to the vehicle by initially positioning the opening (16) at the front end of the bracket and subsequently the screw fitting (70) with a nut and lock washer, already positioned in the slot (13), at the specific bore of the bracket in order to render the positioning of the base profile (10) more flexible. The result is a quick and easy fitting and attachment system that optimizes the installation of the base profile (10) to the brackets as it does not restrict attachment at specific points, rather, it enables attachment along the slot (13) and opening (16), which ensures optimal positioning of the profile according to the user's utilization needs.

The base profile (10) has on its front face a projection (17) provided with flaps (171), (172) and (173) allowing for the fitting and arrangement of trim structures, providing greater variability in the application of other trim components, allowing the profile (10) to be applied to various running board models.

In addition, the base profile (10) offers the possibility of attachment and fitting to the lower portion, through the opening (16) and slot (13), of optional accessories such as: vehicle attachment brackets, support for an ancillary step, lighting points intended to illuminate the floor arranged below the running board, among other accessories.

The trim components attached and fitted to the base profile (10) are divided into: upper trim (20), non-slip step (30) and front trim divided into intermediate trim (40) and lower trim (41).

The upper trim (20) is provided with a pair of projections (21) with prongs (211) and inclined ends (22) provided with a prong (221) that allow for fitting to the upper portion of the base profile (10).

The projections (21) are attached to the projections (12) of the profile (10) by fitting the prongs (211) and (121) so as to lock the trim (20).

The inclined ends (22) are supported by the slots (14) and (15) so that the prong (221) rest on the flaps (141) and (151), keeping the trim (20) positioned over the profile (10).

The construction of attachment between the trim (20) and the profile (10) enables this trim to be moved and to run over the base profile according to the need for adjustment and attachment.

The non-slip step (30) is provided at its upper portion by a flat face (31) which has bas-relief tracks (32) interconnecting with slots (33) arranged transversely to the tracks (32) so as make any water run off more easily and to prevent accumulation of water on the step (30).

The lower portion of the step (30) has projections (34) provided with a prong allowing it to be fitted with the projections (12) of the base profile (10), providing easier assembly and greater positioning variability of the step (30) on the base profile (10).

The step (30) has in its front portion a longitudinal opening (35) that enables the fitting of a lighting and trim structure (36). This lighting structure (36) may have a phosphorescent, fluorescent or LED strip lighting feature, according to the application need and type of running board model.

In addition, structure (36) can be positioned without the lighting feature, serving only as a trim and allowing color variation according to the application need and type of running board model.

The step (30) can be fitted to the profile (10) and overlap the trim structure (20), whereas both structures (20) and (30)

can be moved along the profile (10), allowing optimal positioning according to the need of use and application of the running board to the vehicle.

Step (30) is provided at its side ends by prongs (38) allowing for fitting and positioning of the step to the cavities (14) and (15) of the base profile (10).

Step (30) may also be attached by screw due to the arrangement of projections (37) in the central portion of the lower face, allowing the use and attachment of this step in different profile models.

The upper trim structure (20) allows one or more steps (30) to be arranged with the same construction to maintain the same fitting system.

The lighting points on the running board can be arranged on the opening (35) of the step (30) or by positioning in the lower portion of the base profile (10) on the slot (13) and opening (16).

The intermediate front trim (40) is attached to the front end of the profile (10) so that it fits to the flap (151) of the slot (15) and the flap (171) of the projection (17). This form of application allows adjustment of the trim (40) by moving the structure along the profile (10), allowing optimal positioning according to application and installation needs.

The lower front trim (41) is attached to the front end of the profile (10) and to the intermediate trim (40), and is attached to the flaps (172) and (173) of the projection (17). This form of application allows the adjustment of the trim (41) by moving the structure along the profile (10), allowing optimal positioning according to the need for application and installation.

Trim structures (40) and (41) may vary according to the type, model and need for application of running board to the vehicle, whereas any modification will present the fitting system to the base profile (10).

As such, the base profile (10) has a quick fitting and attachment system on the vehicle assembly brackets (50) through the slot (13) and opening (16); in addition, the profile (10) allows the attachment of a top trim (20) and the non-slip step (30) through a quick clicking system which provides greater application variability and optimal positioning adjustment according to the need installation needs.

The profile (10) fitted with the trim structure (20) and step (30) allows the attachment of trim tips (60) which fit to the cavities and slots of the base profile (10).

Figure 13A:
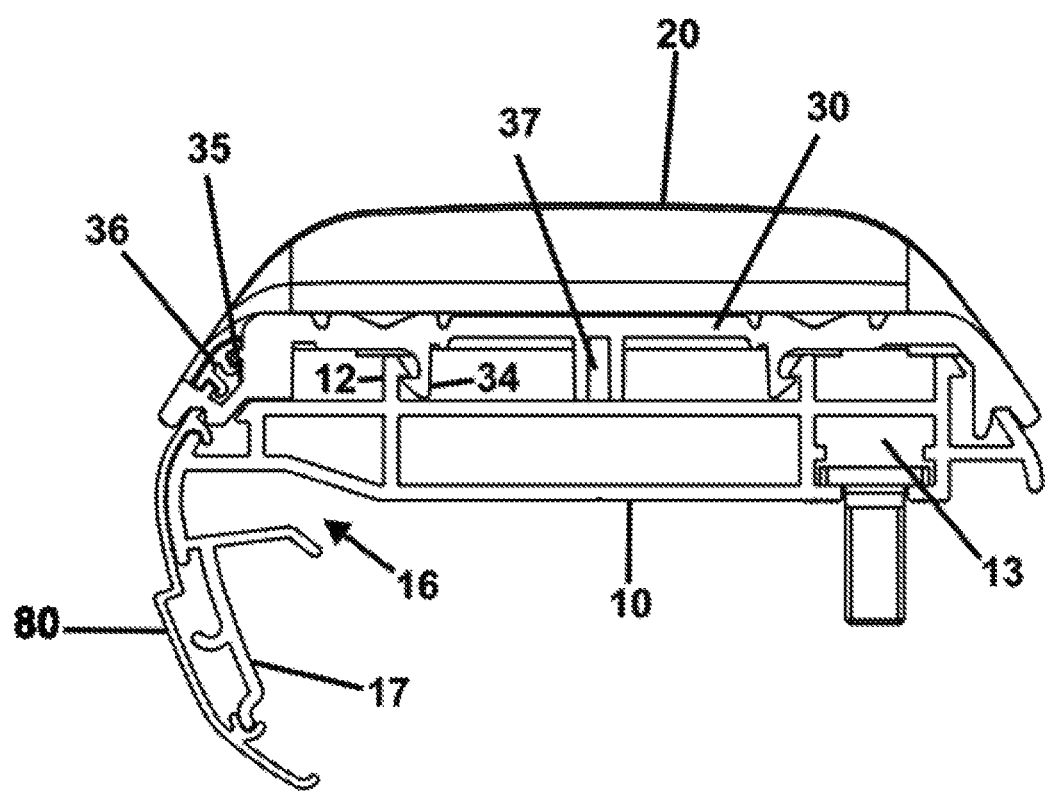
FIG. 13A shows the cross-sectional view detailing the attachment forms.
Figure 14:
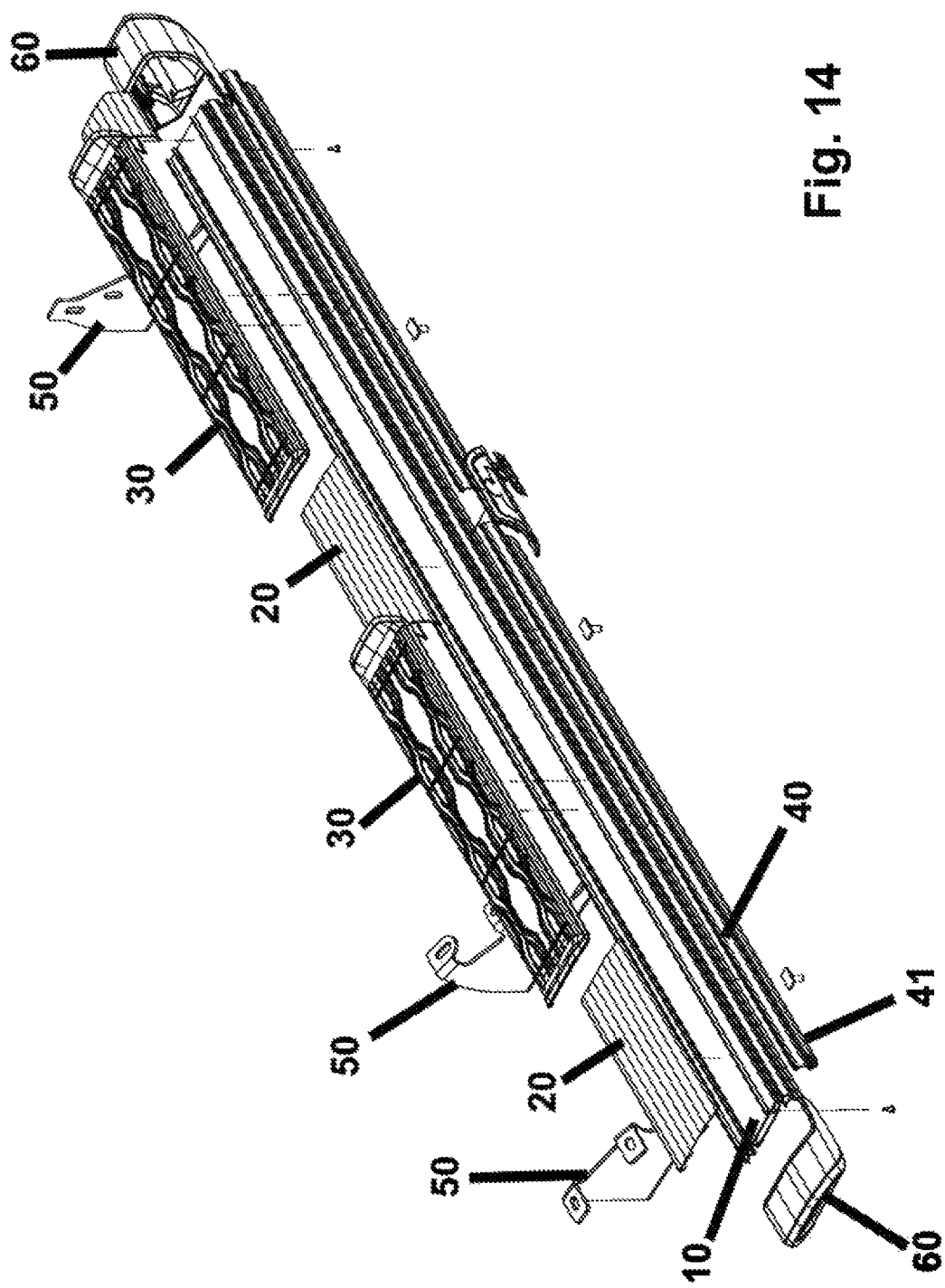
FIG. 14 shows the exploded perspective view of the modular vehicle running board, detailing its components.

The profile (10) allows, in its front portion, for the application and attachment of the two-part trim structure (40) and (41) or the arrangement of a single trim structure (80) with a simpler construction. Thus, the front trim structures are applied to the product according to the user's needs and to the running board model to be placed on the market. The trim structure (80) is shown in FIGS. 13 and 13A for better understanding.

The invention claimed is:

1. MODULAR VEHICLE RUNNING BOARD characterized by comprising a base profile provided with a flat face having in its upper portion a first pair of projections provided with a first prong, arranged along the base profile, whereby at ends of front and rear faces of the base profile a first slot is arranged which is provided with a first pair of flaps, and a second slot with a second pair of flaps, allowing to position and fit trim components with the first pair of projections; in a lower portion of the flat face, a third slot is arranged and provided with a fourth pair of flaps, allowing the arrangement of base profile set screws and a first opening provided with a fifth flap, allowing it to be fitted and positioned to brackets attached to a vehicle, said first opening and the third slot allow the base profile to be positioned to the brackets attached to the vehicle, by positioning the first opening next to the front end of the bracket attached to the vehicle and a screw fitting provided with a locking nut and washer, already positioned in the third slot, at a bore of the bracket attached to the vehicle in order to position the base profile; on a front face of the base profile, a second projection is arranged, which is provided with a plurality of third flaps, allowing the fitting and arrangement of trim structures; an upper trim is provided with a pair of third projections which are attached to the first pair of projections of the base profile by engaging first prongs and second prongs in order to lock the upper trim and inclined ends which are supported against the first and second slots so that the second prongs rest on the first pair of flaps and the second pair of flaps, keeping the upper trim positioned over the base profile; an intermediate front trim is attached to a front end of the base profile so that it fits to the second pair of flaps of the second slot and the plurality of third flaps of the second projection and a lower front trim is attached to the front end of the base profile and to the intermediate trim, and is attached to the plurality of third flaps of the second projection; the base profile and the trim structures are provided with a non-slip step.

2. MODULAR VEHICLE RUNNING BOARD, according to claim 1, characterized in that the slot is provided with the first pair of flaps which facilitate alignment and positioning of the trim components.

3. MODULAR VEHICLE RUNNING BOARD, according to claim 1, characterized in that the slot is provided with the second pair of flaps which facilitate alignment and positioning of the trim components.

4. MODULAR VEHICLE RUNNING BOARD, according to claim 1, characterised in that the trim components arranged with the upper flat face of the base profile are fitted and attached through the first pair of projections, allowing to align and adjust the trim along the flat face, according to the users' installation and attachment needs, ensuring greater variability in assembly.

5. MODULAR VEHICLE RUNNING BOARD, according to claim 1, characterised in that the fitting and attachment system of the base profile to the brackets do not restrict attachment at specific points, but rather enable attachment along the third slot and the first opening, which ensures optimal positioning of the profile according to the user's utilization needs.

6. MODULAR VEHICLE RUNNING BOARD, according to claim 1, characterised in that the base profile offers the possibility of attachment and fitting to the lower portion, through the first opening and the third slot, of optional accessories including vehicle attachment brackets, support for an ancillary step, and lighting points intended to illuminate the floor arranged below the running board.

7. MODULAR VEHICLE RUNNING BOARD, according to claim 1, characterised in that the second projection is provided with the plurality of third flaps allowing for the fitting and arrangement of the trim structures, providing greater variability in the application of other trim components, allowing the base profile to be applied to various running board models.

8. MODULAR VEHICLE RUNNING BOARD, according to claim 1, characterised in that the construction of attachment between the upper trim structures and the base profile enables the upper trim structures to be moved and to run over the base profile according to the need for adjustment and attachment.

9. MODULAR VEHICLE RUNNING BOARD, according to claim 1, characterized in that an intermediate front trim is attached to the front end of the base profile so that it fits to the second pair of flaps of the second slot and the plurality of third flaps of the third projection, allowing adjustment of the front trim by moving the front trim structure along the base profile, allowing optimal positioning according to application and installation needs.

10. MODULAR VEHICLE RUNNING BOARD, according to claim 1, characterized in that a lower front trim is attached to the front end of the base profile and to an intermediate front trim, and is attached to the plurality of third flaps of the second projection, allowing adjustment of the lower front trim by moving the lower front trim structure along the base profile, allowing optimal positioning according to application and installation needs.

11. MODULAR VEHICLE RUNNING BOARD, according to claim 1, characterized in that the front and lower front trim structures enable greater variability according to the type, model, and need for application of running board to the vehicle, whereas any modification will present the fitting system to the base profile.

12. MODULAR VEHICLE RUNNING BOARD, according to claim 1, characterized in that an upper trim structure allows the non-slip steps to be arranged with the same construction to maintain the same fitting system.

13. MODULAR VEHICLE RUNNING BOARD, according to claim 1, characterized in that the lighting points on the running board are arranged on a second opening of the non-slip steps or by positioning in the lower portion of the base profile on the third slot and the first opening.

14. MODULAR VEHICLE RUNNING BOARD characterized in that a non-slip step is provided at its upper portion by a flat face which has bas-relief tracks interconnecting with fourth slots arranged transversely to the bas-relief tracks, whereas a lower portion of the non-slip step has fourth projections provided with a prong allowing it to be fitted with a pair of first projections of a base profile, through clicking, and on a front portion of the non-slip step a longitudinal opening is arranged, which enables the fitting of a lighting; the non slip step allows fitting to the base profile and overlapping over an upper trim structure, whereas the upper trim structure can be moved along the base profile, and at its side ends it has third prongs allowing for fitting and positioning of the non-slip step to first and second slots of the base profile.

15. MODULAR VEHICLE RUNNING BOARD, according to claim 14, characterized in that the non-slip step has fifth projections arranged in the central portion of the lower face, allowing attachment by screw, enabling the use and attachment of the non-slip step in different profile models.

16. MODULAR VEHICLE RUNNING BOARD, according to claim 14, characterized in that the bas-relief tracks interconnecting with the fourth slots arranged transversely to the bas-relief tracks allow water to run off more easily and prevent accumulation of water on the non-slip steps step.

17. MODULAR VEHICLE RUNNING BOARD, according to claim 14, characterized in that the click-attachment system, allows for easier assembly and greater positioning variability of the non-slip step over the base profile.

18. MODULAR VEHICLE RUNNING BOARD, according to claim 14, characterized in that the lighting structure has a phosphorescent, fluorescent or LED strip lighting feature, according to the application need and type of running board model.

19. MODULAR VEHICLE RUNNING BOARD, according to claim 14, characterized in that the lighting structure allows positioning in the step without lighting feature, serving only as a trim and allowing color variation according to the application need and type of running board model.

20. MODULAR VEHICLE RUNNING BOARD, according to claim 14, characterized in that the fitting system of the step with the base profile and a top trim allow variability in the positioning of the components on the base profile, according to the need of use and application of the running board with the vehicle.

* * * * *